A. B. DAVIS.
Scale Beam.

No. 31,534.

Patented Feb. 26, 1861.

Witnesses
Saml. Harwood
Charles C. Foster

Inventor
Henry Howson
Atty for A. B. Davis

UNITED STATES PATENT OFFICE.

AUGUSTUS B. DAVIS, OF PHILADELPHIA, PENNSYLVANIA.

SCALE-BEAM.

Specification of Letters Patent No. 31,534, dated February 26, 1861.

*To all whom it may concern:*

Be it known that I, AUGUSTUS B. DAVIS, of Philadelphia, Pennsylvania, have invented certain new and useful Improvements in Scale-Beams; and I do hereby declare the following to be a full, clear, and exact description of the same, reference being had to the accompanying drawing and to the letters of reference marked thereon.

My invention relates to improvements in that class of weighing apparatus in which two graduated beams are used, and my invention consists of an upper and lower graduated beam, the lower beam being suspended to the upper beam at or near both its ends and being entirely dependent upon the said upper beam both for its support and for the proper performance of its functions, as and for the purpose hereinafter set forth.

The object of my invention is to dispense with the usual lengthy graduated beams and to produce a weighing apparatus of a compact and manageable nature.

In order to enable others skilled in the art to make and use my invention I will now proceed to describe its construction and operation.

Figure 1:
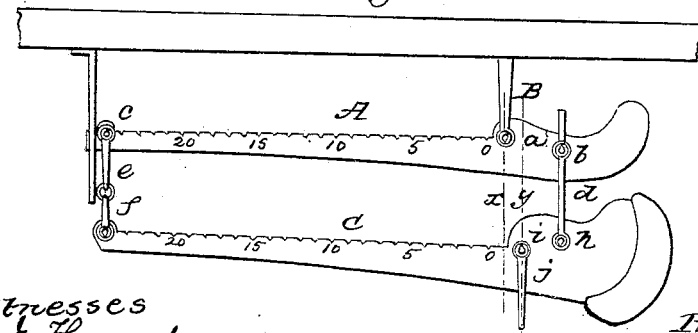

On reference to Figure 1, of the drawing, A is a graduated beam furnished on each side with three sharp edged projections $a$ $b$ and $c$, or, as they are technically termed "knife edged bearings," similar to those used in ordinary scale beams. The projections $a$ are hung in a stationary clevis B which is secured to any convenient object.

C is a second graduated beam situated immediately below the beam A, and connected to the same at one end by the double clevis $d$, and at the opposite end by a double clevis $e$, the upper end of the latter being suspended to the sharp edged projections $c$, and the projections $f$ of the beam C being hung to the lower end of the same double clevis.

The upper end of the double clevis $d$ is suspended to the projections $b$ of the beam A and in the lower end of this clevis rest the projections $h$ of the beam C which has on the opposite sides sharp edged projections $i$ to which is suspended a clevis $j$ for receiving the object the weight of which has to be ascertained.

It will be seen that the fulcrum of the beam A is at the projections $a$, and that the fulcrum of the beam C is at the projections $h$. Now the distance between the projections $b$ and $c$ of the beam A is equal to the distance between the fulcrum $h$ and the projections $f$ of the beam C, it will be observed however that the distance between the projections $b$ and the fulcrum $a$ of the beam A is greater than the distance between the fulcrum $h$ and the projections $i$ of the beam C, the difference of the distances between these points of the two beams being represented by the red lines $x$ and $y$.

The beam A is notched at equal distances beginning at the fulcrum point $a$, the distance between each notch being equal to the distance between the points $x$ and $y$ so that a weight of 20 lbs. suspended to the clevis $j$ of the beam C will exactly balance a weight of one lb. suspended to the beam A at the notch 20, in fact the leverage is precisely the same as if the clevis $j$ with its weight of 20 lbs. was suspended directly to the beam A at a point in the line $y$, which is at the same distance from the fulcrum $a$ of the beam A as the first notch on the same beam is from the same fulcrum. It would be impossible however to suspend the clevis $j$ directly to the beam A so near its fulcrum, as it would interfere with the proper movements and functions of the beam, hence the employment of the supplementary beam C which enables me to dispense with the usual long beam and to produce a more compact and manageable weighing apparatus. This will be the more apparent when it is borne in mind that the distance between the points $x$ and $y$ may if necessary be only one tenth of an inch in which case a weight of one lb. hung to the beam A at a distance of ten inches from its fulcrum would balance a weight of one hundred pounds suspended to the clevis $j$.

As the beam is graduated from the projection $i$ into distances each of which is equal to the distance between the points $x$ and $y$ it will be evident that either beam may be used for ascertaining the weight suspended to the clevis $j$ by the employment of the sliding weight with which graduated scale beams are usually furnished.

Figure 2:
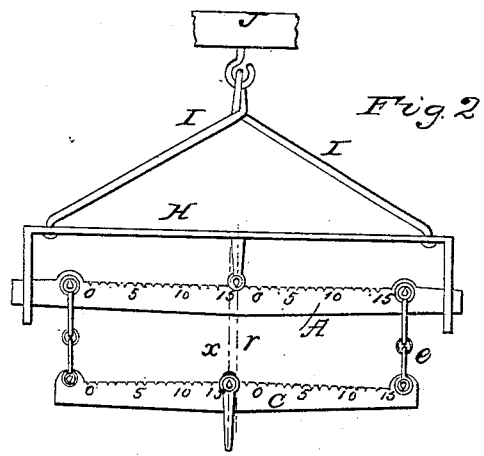

In the modification Fig. 2 two graduated beams A and C are hung to a frame H furnished with diagonal rods or chains I, I, terminating in an eye for receiving the hook of a crane or other hoisting apparatus so as to form what I term a "tackle scale." It will be evident that principles precisely the same as those described in reference to Fig. 1 are embodied in this modification and that these principles enable me to construct a weighing apparatus of that light compact and portable nature which renders it so applicable to a crane or other hoisting apparatus.

Figure 3:
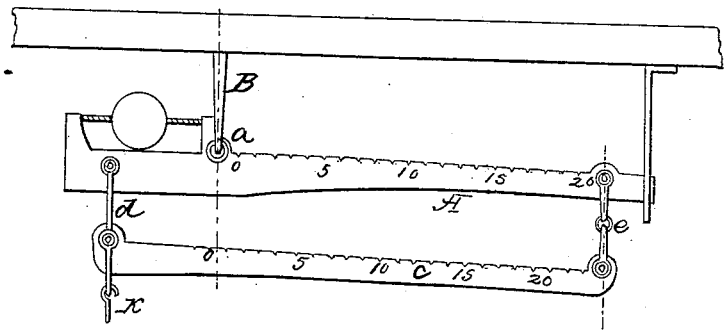

The modification Fig. 3 is especially adapted for use in connection with platform scales. In this case the rod K communicating with the platform is attached to the clevis $d$ the upper beam being suspended to the stationary clevis B as in the case of the modification Fig. 1 and both beams being furnished with sliding weights either of which may be used for ascertaining the weight on the platform. One of the main advantages gained in this and the other modifications is that the two beams afford an opportunity of weighing the tare on one beam and the actual merchandise on the other. For instance if a cart load of coals be on the platform of the scale with which the beams Fig. 3 are connected the weight on one beam is adjusted to a point which will balance the weight of the horse and cart so that when the sliding weight on the lower beam is adjusted to a point which will balance the horse cart together with the contents of the latter the actual weight of the contents may be at once ascertained without any calculations.

I wish it to be understood that I do not claim broadly two or more graduated beams operating in conjunction with each other and forming one weighing apparatus, but

I claim as my invention and desire to secure by Letters Patent—

A weighing apparatus composed of an upper and lower graduated beam, when the lower beam is suspended at or near both its ends to the upper beam, and when it is entirely dependent upon the said upper beam for its support and for the proper performance of its functions as and for the purpose herein set forth.

In testimony whereof, I have signed my name to this specification, in the presence of two subscribing witnesses.

A. B. DAVIS.

Witnesses:
  HENRY HOWSON,
  JOHN WHITE.